United States Patent
Sidlo et al.

(10) Patent No.: US 9,600,813 B2
(45) Date of Patent: *Mar. 21, 2017

(54) POINT OF SALE COMPUTER SYSTEM DELIVERING COMPOSITED TWO- AND THREE-DIMENSIONAL IMAGES

(71) Applicant: Tillster, Inc., San Diego, CA (US)

(72) Inventors: Paul Sidlo, Santa Monica, CA (US); William Kovacs, Camarillo, CA (US); Philip J. Brock, Santa Barbara, CA (US); John O'Keefe, Montrose, CA (US); Jonathan Humpherys, Playa del Rey, CA (US); Andrew Whiddett, Valencia, CA (US); Simon Feltman, Venice, CA (US); Amar Kurani, Los Angeles, CA (US)

(73) Assignee: Tillster, Inc., San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/888,297

(22) Filed: May 6, 2013

(65) Prior Publication Data

US 2013/0246201 A1    Sep. 19, 2013

Related U.S. Application Data

(63) Continuation of application No. 13/560,822, filed on Jul. 27, 2012, now Pat. No. 8,438,065, which is a
(Continued)

(51) Int. Cl.
*G06F 17/40* (2006.01)
*G06Q 20/20* (2012.01)
(Continued)

(52) U.S. Cl.
CPC .......... *G06Q 20/204* (2013.01); *G06F 21/10* (2013.01); *G06F 21/34* (2013.01); *G06F 21/35* (2013.01);
(Continued)

(58) Field of Classification Search
CPC ................. G06F 17/10; G06F 17/40
(Continued)

(56) References Cited

U.S. PATENT DOCUMENTS 4,282,575 A    8/1981   Hoskinson et al.
4,579,213 A    4/1986   Rhine et al.
(Continued)

FOREIGN PATENT DOCUMENTS

JP    2009-167182    6/1997
JP    2000-293740    10/2000
JP    2001-283055    10/2000

OTHER PUBLICATIONS

Cooney, Vance. Determining user interface effects of superficial presentation of dialog and visual representation of system objects in user directed transaction processing systems. Diss. The University of Arizona, 2001 (Attached).*

(Continued)

*Primary Examiner* — Scott Zare
*Assistant Examiner* — Rokib Masud
(74) *Attorney, Agent, or Firm* — Knobbe Martens Olson & Bear, LLP

(57) ABSTRACT

A point of sale computer system that allows a customer to select and consummate a sale himself. The system may include graphics storage media configured to store two- and three-dimensional graphics data relating to the sale, as well as business rules storage media, configured to store business rules that specify the graphics that should be displayed during the selection and consummation process based on input received from the customer. The technology allows a presentation to be made to the customer that is entertaining and that maintains the attention of the customer throughout the sale selection and consummation process.

17 Claims, 2 Drawing Sheets

Related U.S. Application Data continuation of application No. 12/887,344, filed on Sep. 21, 2010, now Pat. No. 8,234,171, which is a continuation of application No. 11/287,130, filed on Nov. 23, 2005, now Pat. No. 7,801,763, which is a continuation of application No. 10/454,010, filed on Jun. 3, 2003, now abandoned.

(60) Provisional application No. 60/386,089, filed on Jun. 4, 2002, provisional application No. 60/392,758, filed on Jul. 1, 2002, provisional application No. 60/388,220, filed on Jun. 12, 2002.

(51) Int. Cl.
| | |
|---|---|
| *G06F 21/10* | (2013.01) |
| *G06F 21/34* | (2013.01) |
| *G06F 21/35* | (2013.01) |
| *G06Q 10/06* | (2012.01) |
| *G06Q 30/00* | (2012.01) |
| *G06Q 30/02* | (2012.01) |
| *G06Q 30/06* | (2012.01) |
| *G07F 7/00* | (2006.01) |
| *G09F 27/00* | (2006.01) |

(52) U.S. Cl.
CPC ......... *G06Q 10/0637* (2013.01); *G06Q 20/20* (2013.01); *G06Q 20/202* (2013.01); *G06Q 30/00* (2013.01); *G06Q 30/02* (2013.01); *G06Q 30/06* (2013.01); *G06Q 30/0623* (2013.01); *G06Q 30/0625* (2013.01); *G06Q 30/0633* (2013.01); *G06Q 30/0643* (2013.01); *G07F 7/00* (2013.01); *G09F 27/00* (2013.01); *G06F 2221/0711* (2013.01); *G06F 2221/0775* (2013.01); *G06F 2221/0797* (2013.01); *G06F 2221/2101* (2013.01); *G06F 2221/2115* (2013.01); *G06F 2221/2117* (2013.01); *G06F 2221/2119* (2013.01); *G06F 2221/2121* (2013.01); *G06F 2221/2135* (2013.01); *G06F 2221/2151* (2013.01)

(58) Field of Classification Search
USPC ............................................. 705/27.2, 14.41
See application file for complete search history.

(56) References Cited

U.S. PATENT DOCUMENTS

| | | | |
|---|---|---|---|
| 4,654,800 A | 3/1987 | Hayashi et al. | |
| 4,814,592 A | 3/1989 | Bradt et al. | |
| 4,839,505 A | 6/1989 | Bradt et al. | |
| 4,896,791 A | 1/1990 | Smith | |
| 5,069,876 A | 12/1991 | Oshinsky | |
| 5,091,713 A | 2/1992 | Horne et al. | |
| 5,235,509 A | 8/1993 | Mueller et al. | |
| 5,239,480 A | 8/1993 | Huegel | |
| 5,267,171 A | 11/1993 | Suzuki et al. | |
| 5,353,219 A * | 10/1994 | Mueller | G06Q 10/087 705/16 |
| 5,408,417 A | 4/1995 | Wilder | |
| 5,414,741 A | 5/1995 | Johnson | |
| 5,450,938 A | 9/1995 | Rademacher | |
| 5,482,139 A | 1/1996 | Rivalto | |
| 5,497,141 A | 3/1996 | Coles et al. | |
| 5,502,636 A | 3/1996 | Clarke | |
| 5,528,735 A * | 6/1996 | Strasnick | G06F 3/04815 345/427 |
| 5,625,562 A | 4/1997 | Veeneman et al. | |
| 5,641,050 A | 6/1997 | Smith et al. | |
| 5,652,421 A | 7/1997 | Veeneman et al. | |
| 5,687,322 A | 11/1997 | Deaton et al. | |
| 5,774,868 A | 6/1998 | Cragun et al. | |
| 5,806,071 A | 9/1998 | Balderrama et al. | |
| 5,832,457 A | 11/1998 | O'Brien et al. | |
| 5,839,115 A | 11/1998 | Coleman | |
| 5,895,457 A | 4/1999 | Kurowski et al. | |
| 5,995,942 A | 11/1999 | Smith et al. | |
| 6,059,142 A | 5/2000 | Wittern, Jr. et al. | |
| 6,070,717 A | 6/2000 | Philipson et al. | |
| 6,085,888 A | 7/2000 | Tedesco et al. | |
| 6,088,681 A | 7/2000 | Coleman et al. | |
| 6,152,591 A | 11/2000 | McCall et al. | |
| 6,161,059 A | 12/2000 | Tedesco et al. | |
| 6,283,322 B1 | 9/2001 | Liff et al. | |
| 6,292,786 B1 | 9/2001 | Deaton et al. | |
| 6,296,184 B1 | 10/2001 | Dejaeger | |
| 6,298,972 B1 | 10/2001 | Tedesco et al. | |
| 6,304,855 B1 | 10/2001 | Burke | |
| 6,317,650 B1 | 11/2001 | Powell et al. | |
| 6,317,835 B1 | 11/2001 | Bilger et al. | |
| 6,324,520 B1 | 11/2001 | Walker et al. | |
| 6,356,794 B1 | 3/2002 | Perin, Jr. et al. | |
| 6,367,516 B1 | 4/2002 | Christman et al. | |
| 6,370,240 B1 | 4/2002 | Woynoski et al. | |
| 6,377,935 B1 | 4/2002 | Deaton et al. | |
| 6,386,323 B1 | 5/2002 | Ramachandran et al. | |
| 6,397,126 B1 | 5/2002 | Nelson | |
| 6,397,193 B1 | 5/2002 | Walker et al. | |
| 6,401,009 B1 | 6/2002 | Chandonnet | |
| 6,401,074 B1 * | 6/2002 | Sleeper | G06Q 20/20 235/383 |
| 6,513,019 B2 | 1/2003 | Lewis | |
| 6,539,419 B2 | 3/2003 | Beck et al. | |
| 6,542,588 B1 | 4/2003 | Mashinsky | |
| 6,587,849 B1 | 7/2003 | Mason et al. | |
| 6,692,127 B2 | 2/2004 | Abitbol et al. | |
| 6,792,401 B1 | 9/2004 | Nigro et al. | |
| 6,854,010 B1 | 2/2005 | Christian et al. | |
| 6,940,393 B2 | 9/2005 | Dev et al. | |
| 6,959,833 B1 | 11/2005 | Paul | |
| 7,165,721 B2 | 1/2007 | Wagner et al. | |
| 7,257,536 B1 | 8/2007 | Finley et al. | |
| 7,801,763 B2 | 9/2010 | Sidlo et al. | |
| 8,234,171 B2 | 7/2012 | Sidlo et al. | |
| 2002/0120627 A1 | 8/2002 | Mankoff | |

OTHER PUBLICATIONS

Japanese Office Action dated May 26, 2009 for Japanese Patent Application No. P2004-513882.
JP Publication No. 09167182.
JP Publication No. 2000293740.
JP Publication No. 2001283055.
Office Action dated Apr. 3, 2009 from U.S. Appl. No. 10/461,141.
Supplementary European Search Report dated Sep. 16, 2009.
William Rice, Chicago Tribune. "Videos on the Back Burner Despite High Expectations for Cooking Videos, Consumers Haven't Warmed Up to Them :[3 Star Edition]." Orlando Sentinel Sep. 17, 1992, Orlando Sentinel, ProQuest. Web. May 7, 2010.

* cited by examiner

POINT OF SALE COMPUTER SYSTEM DELIVERING COMPOSITED TWO- AND THREE-DIMENSIONAL IMAGES

CROSS-REFERENCE TO RELATED APPLICATIONS

This application is a continuation of U.S. patent application Ser. No. 13/560,822, filed Jul. 27, 2012, which is a continuation of U.S. patent application Ser. No. 12/887,344, filed Sep. 21, 2010 (now U.S. Pat. No. 8,234,171), which is a continuation of U.S. patent application Ser. No. 11/287,130, filed on Nov. 23, 2005 (now U.S. Pat. No. 7,801,763), which is a continuation of U.S. patent application Ser. No. 10/454,010, filed Jun. 3, 2003, entitled "Point of Sale Computer System Delivering Composited Two- and Three-Dimensional Images," which claims the benefit of the following provisional patent applications: U.S. Provisional Ser. No. 60/386,089, filed Jun. 4, 2002, entitled "Real Time Engine;" U.S. Provisional Ser. No. 60/392,758, filed Jul. 1, 2002, entitled "Real Time Engine with 2D/3D Detail;" and U.S. Provisional Ser. No. 60/388,220, filed Jun. 12, 2002, and entitled "Customer-Operated Ordering System and Method." The content of each of the above-mentioned applications is incorporated herein by reference.

BACKGROUND OF THE INVENTION

Field of the Invention

This application relates to computer terminals at which orders are placed and, more particularly, to computer terminals at the point of sale that are operated directly by customers.

Description of the Related Art

The consummation of a sale of a product or service at a point of sale location has traditionally required the investment of time. Even for commodity items such as the menu items served at quick service restaurants, employee time must be spent receiving and entering selections made by customers. Time must also often be spent collecting money and providing change. The costs of such personnel, of course, add to expenses, often reducing profit.

To reduce this overhead, customer-operated point of sale computer systems have been proposed. These systems allow customers to themselves obtain information about products and services and to consummate sales for their purchase.

Unfortunately, many customer-operated, point of sale computer systems have not proven to be successful. They are often difficult to operate and viewed by the customer as unfriendly and a burden or impediment, discouraging the very sales that they were intended to promote. In many of these systems, moreover, it is often difficult to make frequent changes in the products or services that are offered, in their descriptions and in their pricing.

SUMMARY OF THE INVENTION

A point of sale computer system may allow a customer to select and consummate a sale himself.

The system may include a display configured for the customer to view during the selection and consummation process; an input device configured to be operated by the customer during the selection and consummation process and to generate control signals in response to operation of the input device by the customer; graphics storage media configured to store two and three-dimensional graphics data relating to the sale; business rules storage media configured to store business rules that specify the graphics that should be displayed during the selection and consummation process based on the control signals from the input device; and a processing system.

The processing system may be configured to communicate with the display, the input device, the graphics storage media and the business rules storage media; obtain selected two and three-dimensional graphics data in real time from the graphics storage media in response to control signals received from the input device and in accordance with the business rules; composite the obtained two and three-dimensional graphics data in real time into a non-linear, three-dimensional graphics presentation; and deliver the three-dimensional graphics presentation in real time to the display for viewing by the customer.

The three-dimensional graphics presentation may entertain the customer during the selection and consummation process.

The three-dimensional graphics presentation may include animation relating to the sale. The animation may include animated three-dimensional graphics relating to the sale.

The business rules may specify how, when and/or where the graphics should be displayed during the selection and consummation process.

The system may further include a payment acceptance device configured to accept payment from the customer for the consummated sale.

The system may include a cash disbursement device configured to disburse cash to the customer. The cash disbursement device may be configured to disburse change in response to overpayment for the sale.

The three-dimensional graphics presentation may include a series of scenes, the content of each of which is dictated by the input received from the customer. The three-dimensional graphics presentation may include programmed graphics transitions between each scene. The programmed graphics transitions may include an image of a selected item being transfer to an image of a shopping container. The shopping container may be a shopping bag or cart. The programmed graphics transitions may be managed by the business rules.

The three-dimensional graphics presentation may communicate in a language and the customer may select the language that is used.

The system may further include other data storage media configured to store other data relating to the sale. The processing system may communicate with the other data storage media. The business rules may specify the graphics that should be displayed during the selection and consummation based on the data in the data storage media.

The processing system may be configured to seek, obtain and record the identity of the customer and the other data may include data about the customer. The data about the customer may include data about the input received from the customer during previous visits to the point of sale computer system.

The other data may include data about the inventory of products or services that may be selected by the customer for the sale.

The other data may include data about promotional campaigns relating to the sale.

The display and input device may or may not both be contained in a kiosk.

The sale may be of a product, such as prepared food.

The graphics data may include images of products or services that the customer may select to purchase. An image of a product or service may be represented by three-dimensional graphics data.

The graphics data may include an image of a companion for the customer, and the business rules may include rules to cause the image of the companion to be displayed to the customer during the selection process.

The graphics data may include cross-promotional graphics that promote a product or service other than one that the customer may select during the selection and consummation process, and the business rules may cause the cross-promotional graphics to be part of the three-dimensional graphic presentation.

The graphics data may include text in a graphics format.

The system may further include a sound transducer configured for the customer to hear during the selection and consummation process.

The graphics data may include multimedia data containing both image and sound information relating to the sale, and the processing system may cause the sound to be delivered to the sound transducer when the image portion of the multimedia data is delivered to the display.

The system may further include sound storage media configured to store sound data relating to the sale. The business rules may specify the sound that should be delivered during the selection and consummation process based on the control signals from the input device. The processing system may be configured to communicate with the sound storage media, select sound data in real time from the sound storage media in response to control signals received from the input device and in accordance with the business rules, and deliver the selected sound data to the sound transducer along with the three-dimensional graphics presentation.

The graphics storage media and/or the business rules storage media may be configured to be updated from a remote source.

A method may allow a customer to select and consummate a sale himself using a point of sale computing system. The method may include receiving control signals in response to the operation of an input device by the customer during the selection and consummation process; selecting two and three-dimensional graphics relating to the sale in real time from a graphics storage media based on the control signals received from the input device and in accordance business rules that specify the graphics that should be displayed during the selection and consummation process; compositing the selected two and three-dimensional graphics in real time into a non-linear, three-dimensional graphics presentation; delivering the three-dimensional graphics presentation in real time to a display for viewing by the customer; and displaying the three-dimensional graphics presentation in real time to the customer.

Computer program storage media may contain a computer program that, when loaded in a computer system along with other software, allows a customer to select and consummate a sale himself with a point of sale computer system. The loaded program may allow receiving control signals in response to the operation of an input device by the customer during the selection and consummation process; selecting two and three-dimensional graphics relating to the sale in real time from a graphics storage media based on the control signals received from the input device and in accordance business rules that specify the graphics that should be displayed during the selection and consummation process; compositing the selected two and three-dimensional graphics in real time into a non-linear, three-dimensional graphics presentation; delivering the three-dimensional graphics presentation in real time to a display for viewing by the customer; and displaying the three-dimensional graphics presentation in real time to the customer.

A point of transaction computer system may allow a customer to select and consummate a business transaction himself.

The system may include a display configured for the customer to view during the selection and consummation process; an input device configured to be operated by the customer during the selection and consummation process and to generate control signals in response to operation of the input device by the customer; graphics storage media configured to store two and three-dimensional graphics data relating to the transaction; business rules storage media configured to store business rules that specify the graphics that should be displayed during the selection and consummation process based on the control signals from the input device; and a processing system.

The processing system may be configured to communicate with the display, the input device, the graphics storage media and the business rules storage media; obtain selected two and three-dimensional graphics data in real time from the graphics storage media in response to control signals received from the input device and in accordance with the business rules; composite the obtained two and three-dimensional graphics data in real time into a non-linear, three-dimensional graphics presentation; and deliver the three-dimensional graphics presentation in real time to the display for viewing by the customer.

The business transaction may include reserving an item to purchase and/or extending credit.

A point of sale computer system may allow a customer to himself select and receive information about a potential business transaction that the customer may then consummate at the location of the computer system.

The system may include a display configured for the customer to view during the selection and receiving process; an input device configured to be operated by the customer during the selection and receiving process and to generate control signals in response to operation of the input device by the customer; graphics storage media configured to store two and three-dimensional graphics data containing information about the potential business transaction that the customer may then consummate at the location of the computer system; business rules storage media configured to store business rules that specify the graphics that should be displayed during the selection and receiving process based on the control signals from the input device; and a processing system.

The processing system may be configured to communicate with the display, the input device, the graphics storage media and the business rules storage media; obtain selected two and three-dimensional graphics data in real time from the graphics storage media in response to control signals received from the input device and in accordance with the business rules; composite the obtained two and three-dimensional graphics data in real time into a non-linear, three-dimensional graphics presentation; and deliver the three-dimensional graphics presentation in real time to the display for viewing by the customer.

An enterprise level point of sale computer system for an enterprise having several geographically-separated point of sale locations may allow customers at the various locations to select and consummate a sale themselves.

The system may include a local computer management system at each point of sale location. Each local computer may include a display configured for a customer to view during the selection and consummation process; an input device configured to be operated by the customer during the selection and consummation process and to generate control signals in response to operation of the input device by the customer; graphics storage media configured to store graphics data; business rules storage media configured to store business rules that specify the graphics that should be displayed during the selection and consummation process based on the control signals from the input device; and a processing system.

The processing system may be configured to communicate with the display, the input device, the graphics storage media and the business rules storage media; obtain selected graphics in real time from the graphics storage media in response to the control signals received from the input device and in accordance with the business rules; composite the selected graphics in real time into a non-linear, graphics presentation; and deliver the graphics presentation in real time to the display for viewing by the customer The system may include a global computer management system configured to communicate with each local computer management systems and to deliver graphics and business rules to each local computer management systems for storage in their respective graphics storage media and business rules storage media.

At least one local computer management system may further include a manager station configured to control and update the graphics and business rules that are stored in its graphics and business rules storage media.

The manager station may be further configured to selectively subscribe to classes of graphics and business rules to be delivered from the global computer management system.

The manager station may be further configured to selectively load graphics data in the graphics data storage media and business rules in the business rules storage media. At least portions of the selectively loaded graphics data and business rules may be tailored to the point of sale location associated with the manager station.

The graphics storage media may be further configured to store two and three-dimensional graphics data relating to the sale; and the processing system may be further configured to obtain selected two and three-dimensional graphics data in real time from the graphics storage media in response to control signals received from the input device and in accordance with the business rules; composite the obtained two and three-dimensional graphics data in real time into a non-linear, three-dimensional graphics presentation; and deliver the three-dimensional graphics presentation in real time to the display for viewing by the customer.

These, as well as still further features, objects and benefits will now become clear upon reviewing the following detailed description of illustrative embodiments and accompanying drawings.

DETAILED DESCRIPTION OF THE PREFERRED EMBODIMENT

Figure 1:
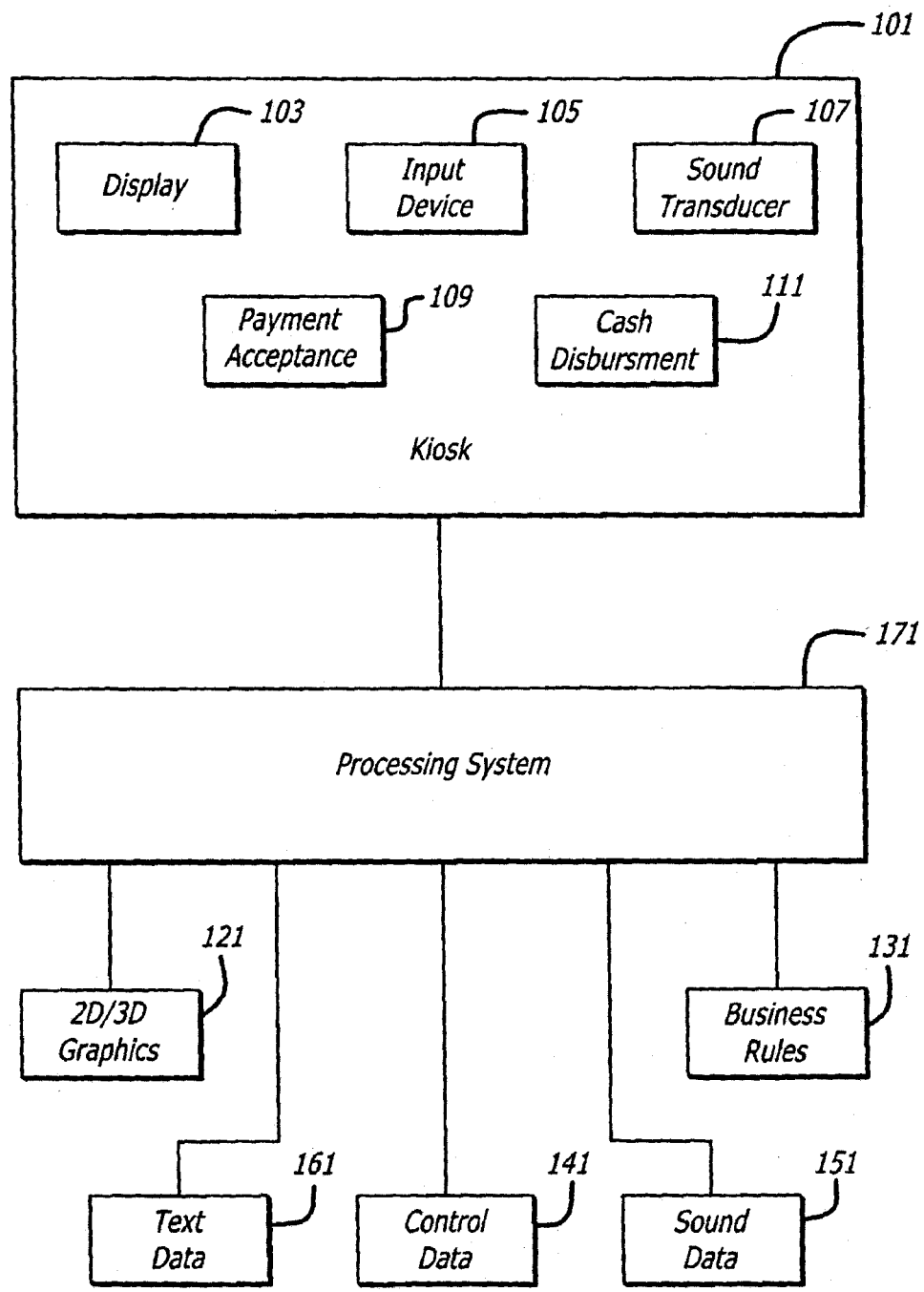
FIG. 1 is a block diagram of a point of sale computer system.

FIG. 1 is a block diagram of a point of sale computer system.

One function of this system may be to allow a customer to select and consummate a sale himself. The selection may be of one or more products, such as items of food, information or services.

A kiosk 101 may be positioned so that it is readily accessible to the customer and can be easily operated by the customer. The kiosk 101 may include a display 103, an input device 105, a sound transducer 107, a payment acceptance device 109 and a cash disbursement device 111.

The kiosk 101 may communicate with the customer through the display 103 and the sound transducer 107 based on input received from the customer from the input device 105. The communication may be in an entertaining manner so as to maintain the interest of the customer and to thus entice the customer to select and consummate a sale.

The kiosk 101 may be positioned at any location at which a product or service is provided. It may be at a retailing venue, such as a quick service restaurant, fast casual restaurant or a concession stand. It might be positioned in an amusement park, a theater, stadium or in a bank. It could be part of an automatic teller machine (ATM).

The kiosk 101 may be positioned in a public area, in a home, on its own without any surrounding business, or as part of another apparatus, such as a food delivery counter.

The display 103 may be configured for the customer to directly view during the selection and consummation process. It may operate in a graphics mode and may include an electroluminous display, such as a CRT, plasma display, LCDs or even LEDs. The display 103 may include a front or rear projector. The display 103 could be the display on a laptop owned by the customer. In this embodiment, the laptop could communicate wirelessly with the other components of the point of sale computer system. The display 103 might be any other type of known or hereinafter invented display, as well as a combination of such devices.

The display 103 may be positioned in close proximity to the customer or at a distance. It might be a display that is shared by the customer with other customers.

The input device 105 is configured to be operated by the customer during the selection and consummation process. In response to operation of the input device 105 by the customer, the input device 105 generates control signals.

The input device 105 may be a touch screen, keyboard, mouse, panel buttons, microphone, telephone, wireless device (e.g., a laptop with a wireless connection), mobile phone, cell phone or PDA. The input device 105 might be a remote control of the type used to control televisions using infrared or RF. The input device 105 might be a joystick. The input device 105 might be a RF ID tag. The input device 105 might be any other type of known or hereinafter invented input devices, as well as a combination of such devices.

The input device 105 may be part of the kiosk 101, as shown in FIG. 1. It might be separate from the kiosk 101. It may be near the display 103 or far from the display 103.

The sound transducer 107 may be included to produce sound for the customer to hear. It may be a loudspeaker, headphones, or a wireless apparatus that communicates to a remote sound transducer, such as a speaker contained in a laptop. The sound transducer 107 may be within the kiosk 101, or outside of it.

The payment acceptance device 109 may be included in the kiosk 101 or elsewhere to accept payment for the transaction from the customer. The payment acceptance device 109 may be configured to receive and verify credit cards, such as a charge card or a debit card, such as an ATM card. It may be configured to receive bills and/or coins. It may be configured to receive currency issued by different countries.

The cash disbursement device 111 may be included to disburse cash to the customer in the form of bills, coins or otherwise. As with the payment acceptance device 109, the cash disbursement device 111 may disburse cash in currency issued by different countries.

The cash disbursement device 111 may be located within the kiosk 101 or elsewhere.

The point of sale computer system shown in FIG. 1 may include graphics storage media 121 for storing graphics data representative of two- and three-dimensional graphics. The graphics storage media 121 may include magnetic media, such as hard disks and floppies, optical media, such as CDs or DVDs, or electronic media, such as a ROM. The media could be single device or multiple devices. The media could be any other type of storage device now known or later developed.

The graphics storage media 121 may be configured in association with other well known systems, such that its content can be updated locally and/or remotely.

The graphics storage media 121 may store a broad variety of graphics data. It may be a database of rich media of broadcast or film quality.

Included within the graphics that may be stored within the graphics storage media 121 are two-dimensional and three-dimensional graphics.

References to "two-dimensional" and "three-dimensional" are not intended to refer to the actual image that is produced. Rather, and as is known in the art, they are intended to refer to the type of data that is representative of these images and, in turn, the type of processing that may be readily performed on this data.

Two-dimensional image data, for example, can usually be filtered, layered, warped, composited and presented in a sequence as an animation.

Three-dimensional image data can usually be processed in all of the ways that two-dimensional image data can be processed. Unlike two-dimensional image data, however, three-dimensional image data contains information sufficient to allow the image to be generated as it would appear if it were viewed from different perspectives.

A two-dimensional image of a block, for example, looks like a three-dimensional object in the image. However, the image data is usually not sufficient to allow any other perspective of the block to be shown. Three-dimensional graphics image data, on the other hand, is sufficient to allow an image to be created that accurately depicts the block from several viewing perspectives.

Three-dimensional graphics data may include geometry that represents physical objects and surfaces, lights to illuminate the scene, transforms to position the geometry in space, materials or texture maps to describe the surface attributes of the geometry, cameras to represent viewpoints from which the images are generated, and elements to describe the scene, such as shaders and environment parameters, such as fog and haze.

Three-dimensional graphics data may be represented as a direct acyclic graph (DAG) that permits grouping, parent/child relationships and hierarchical constructs.

The images that are represented by the two- and three-dimensional graphics data in the graphics storage media 121 can vary widely.

The images may be still or video images of the products or services that the customer may select. The images may include information related to the products or services, such as descriptions, general information, pricing, terms of purchase and legal disclaimers.

The images may include material that is not directly related to the sale. For example, the images may contain cross-promotional messages to promote products or services not available for purchase at the point of sale location, or from the point of sale computer system. For example, a point of sale computer system at a fast service restaurant may include a preview for an upcoming movie. The images may be targeted to establishing or enhancing a brand name.

The graphics may be designed such that, when presented, they entertain the customer and entice the customer to make a selection and to consummate the sale. The graphics may include amusing material. It may include a virtual escort, friend or companion that accompanies the customer during the selection and/or consummation process. It may include a virtual salesperson that speaks to the customer.

One or more of the images may be animated. The animation data may be two-dimensional or three-dimensional.

The graphics data may include scene transitions, that is, one or more transitional segments that are displayed between scenes.

One example of such a scene transition is graphics that illustrates a selected food item being moved from the selection area on the screen to a container, such as a bag or shopping cart.

The graphics data may include imbedded soundtracks or text characters that are played or displayed, respectively, while the graphic image is being displayed.

The graphics data may include textual information in the form of a two-dimensional or three-dimensional graphic image.

The graphics data may include the same image in different data formats. These formats might be selected to match variations in the hardware environment, thus insuring that a particular image can be displayed on primitive hardware, while providing the opportunity for that same image to be displayed in a more sophisticated format on more sophisticated hardware.

Image information about products or services could similarly be stored in different formats to facilitate different product promotional strategies, such as special sales or combination packaging.

The point of sale computer system may include a business rules storage media 131.

From a hardware perspective, the business rules storage media 131 may be of any of the types that are discussed above in connection with the graphics storage media 121. As with the graphics storage media 121, the business rules storage media 131 may be configured in association with other systems to be able to be updated locally and/or remotely.

A broad variety of business rules may be stored in the business rules storage media 131.

The business rules may specify which, how, where and when the graphics in the graphics storage media 121 should be displayed on the display. This specification may depend upon the input signals received the input device 105 from the customer.

For example, the business rules might specify that the display 103 display a graphic animation of a child enjoying a Big Mac and fries and, perhaps with it, sounds of happy children in the background. Upon receiving an input at the input device 105 signaling that a customer has input a request for a menu, the business rules might specify that the animation of the child eating the Big Mac should be reduced in size and volume and positioned in the upper left hand corner of the display. The rules might further specify that an image of a menu be displayed in the main area of the screen at the same time. The rules might further specify that an animation of a virtual guide appear at the right side of the screen and that the soundtrack of a voice asking "What would you like to eat?" be played in synchronism with lips moving on the animation.

Upon receipt of an input signal from the input device 105 indicating that the customer has selected a Big Mac from the menu, the business rules might specify that an animation be played as a scene transition showing the selected food item being moved into a bag, followed by the bag being placed in the upper right hand corner of the screen, followed by a return to the menu for further selections.

The business rules may specify other functionality of the system, such as the delivery of pricing information, including the price of a package of selections, such as a Happy Meal.

The business rules may specify varying modes of the operation of the input device 105. For example, the business rules might specify that, after a customer selects a particular item, the input device controls movement of that selected item, allowing the customer to rotate the item so that he may see it from various angles. To accomplish this, the business rules might dictate that a three-dimensional graphic image of the item that is stored in the graphics storage media be retrieved and displayed on the screen and that its data set should be manipulated by the control signals from the input device 105.

The business rules may specify the graphics that should be displayed in the absence of customer input, including while the kiosk 101 is not being used by any customer or after a sale has been completed. The business rules may specify the graphics that should be displayed if the customer fails to provide any input after a pre-determined amount of time.

The business rules may be used to control aspects of the transaction, other than communications with the customer. For example, the business rules may be used to direct the order that the customer places to an ordering section of the business for fulfillment. Similarly, the business rules might an invoice for the purchase to be created and delivered to an inventory or accounting section of the business.

The business rules may be configured to direct the delivery of promotional messages to the customer using other image data in the graphics storage media 121.

The business rules may be used to control the language in which the point of sale computer system communicates with the customer. With this feature, the business rules might be configured to deliver images from the graphics storage media 121 to the customer that invite the customer to select a desired language, and to thereafter select the graphics that are stored in the graphics storage media 121 that are in this language.

A control data storage media 141 may be used as part of the point of sale computer system. The control data storage media 141 may be used to store information that is intended to affect the presentation to the customer by the kiosk 101. For example, the control data storage media 141 might specify the hardware environment so that the optimum graphics data can be selected from the graphics storage media 121. It might specify changes in the presentation that should be made as a function of time, date, season, geographic location, temporary promotional campaigns, customer data (e.g., the identity of the customer or the customer's usage history) or inventory.

The control data storage media 141 may include any of the hardware types of storage media that are described above in connection with the graphics storage media 121. It may similarly be updated locally and/or remotely.

The business rules storage media 131 may include business rules that test for the presence of one or more types of control data in the control data storage media 141 and, based on the results of this test, modify the graphics presentation that the business rules dictate.

The point of sale computer system may include sound data storage media 151. This media may contain sound files that, under the management of the business rules in the business rules storage media 131, may be played through the sound transducer 107 during the selection and consummation process. Unlike a soundtrack recorded as part of a graphic image, the sound data stored in the sound data storage media 151 need not always be associated with a particular graphic image.

The hardware used to implement the sound data storage media 151 may be any of the types discussed above in connection with the graphics storage media 121. As with the graphics storage media 121, the sound data storage media 151 may be updated remotely and/or locally.

The point of sale computer system may include text data storage means 161 for storing text data files. As with the sound data, the text data may similarly be displayed on the display 103 or played on the sound transducer 107 (using a speech synthesizer) during the selection and consummation process. Like the sound data files in the sound data storage media 151, the text data need not always be displayed in association with any particular graphic image. The display of the text data may be subject to the control of the business rules in the business rules storage media 131. The text data storage media may be any of the types described above in connection with the graphics storage media 121. The text data storage media may be updated locally and/or remotely.

The point of sale computer system may include a processing system 171. The processing system may communicate and ultimately control each of the other components in the point of sale computer system, such as the display 103, the input device 105, the sound transducer 107, the payment acceptance device 109, the cash disbursement device 111, the graphics storage media 121, the business rules storage media 131, the control data storage media 141, the sound data storage media 151 and the text data storage media 161.

The processing system 171 may consist of a single microprocessor or several microprocessors. It may include associated interface, memory and communication devices. It may include one or more complete computer systems. The processing system 171 may all be in a single location, such as in the kiosk 101, along with the graphics, business rules, sound data, control data and text data storage media 121, 131, 141, 151 and 161, or these components may be in other locations. The components may all be located together, or they may be at separate locations.

The processing system 171 may monitor the control signals received from the input device 105. In response, the processing system 171 may consult the business rules in the business rules storage media 131 to determine what action should be taken.

The business rules may direct the processing system 171 to obtain selected two- and three-dimensional graphics data from the graphics data storage media 121. The business rules may direct the processing system 171 to obtain selected sound data, control data and/or text data from the sound data storage media 151, the control data storage media 141 and the text data storage media 161, respectively.

The processing system 171 may then composite this retrieved data in real time into a non-linear, three-dimensional graphics presentation. The processing system 171 may then deliver that graphics presentation to the display 103 and, if it contains audio, to the sound transducer 107. The presentation is then displayed and, if a sound transducer is present, played.

The phrase "real time" as used in this application is intended to reflect the concept of the graphics presentation being composited and displayed promptly in response to control signals from the input device 105. Of course, it is to be understood that at least segments of this presentation might be composited before receiving any control signals from the input device 105. This might occur as an intrinsic part of the business rules that are stored in the business logic storage media 131. It might be a pre-conceived presentation that is stored as a single movie file in the graphics storage media 121.

The phrase "non-linear" as used in this application is intended to reflect the concept that the sequence of graphics that are presented on the display 103 during the sale selection and consummation process is not entirely pre-conceived, but rather varies as a function of the input provided by the customer to the input device 105. Of course, it is to be understood that segments of this non-linear presentation may be pre-conceived, either in the form of an animation in the graphics storage media 121 and/or in the form of pre-determined business rules in the business rules storage media 131.

The business rules in the business rules storage media 131 may include rules that direct the processing system 171 to present more than one graphic image from the graphics storage media 121 on the display at the same time. In this instance, the business rules may specify exactly which images to display, where on the display the images should be displayed, and/or how they should be displayed.

Business rules that specify how a two-dimensional image should be displayed may specify that the image be filtered, warped or layered with other images.

Business rules that specify how three-dimensional images should be displayed may specify the perspective of the image that should be shown, as well as any variations in that perspective that should take place as a function of time, customer input to the input device 105, or other criteria; the lighting of the image; and shaders and environment parameters, such as fog and haze.

The business rules may specify that both two- and three-dimensional images be displayed at the same time.

The composite prepared by the processing system 171 under the direction of the business rules may constitute a three-dimensional graphics presentation. This means that at least certain elements in the presentation, at at least certain times, will be three-dimensional graphic elements, i.e., elements comprised of data that permit the elements to be displayed from more than a single desired perspective.

As should be apparent to those skilled in the art, there are a broad variety of ways to composite two- and three-dimensional images into a three-dimensional graphics presentation.

One such way is for the processing system 171 to work with the graphical user interface of the display 103 by way of a wrapper that may be a layer of C++ classes and functions. The core classes and functionality may specify what, how and where both two- and three-dimensional graphics should be presented within a scene, e.g., within a window being displayed on the display 103. The processing system 171 may include appropriate software for defining and managing user interactions within the context of the visual scene.

A scene may be conventionally represented as a Direct Acyclic Graph (DAG) that permits grouping, parent/child relationships and hierarchical constructs. Two-dimensional elements may be added to this scene through the use of an overlay. These overlays may be part of the scene, but not part of the DAG. Resources (such as bitmaps) can nevertheless be shared between the overlays and materials.

The compositing operation may be performed on every frame of a bitmap.

Each type of three-dimensional and two-dimensional element (e.g., light, material, camera, geometry, modifier) may be represented by its own class. A scene may contain an element list for each class. It would then contain both a 3D DAG for three-dimensional elements and a 2D DAG for two-dimensional elements. Hierarchical elements may be implemented within the 3D DAG, including transformations, material inheritance, visibility inheritance and group picking. Hierarchical methods may be implemented within the 2D DAG, including transformations and visibility. Overlay classes may be used to represent where on the display device an image should be displayed. They may contain or reference a full compositing tree of operations. Interactive and GUI methods (e.g., picking, business logic and screens) may be applied to the relevant 2D and 3D classes.

The graphics, business rules, control data, sound data and text data that is stored, respectively, in the graphics storage media 121, business rules storage media 131, control data storage media 141, sound data storage media 151 and text data storage media 161, may be stored in one or more database structures. Communications with these databases may include ODBC and/or MAPOP plug-ins. ODBC plug-ins can be used to connect certain scene classes to dynamic data sources, such as relational databases, GPS data feeds or flat files. This may allow such things as language-sensitive buttons to be created that would query a relational database for the words, language and font that would be used on the button. It might allow the system to respond to external events, such as an ATM-type device.

MAPOP plug-ins may be used to represent custom 2D compositing/image processing operations that are not already supported. These can facilitate operations such as creating a bitmap from a live video feed or performing a custom spin blur.

A class element called a screen may be included. This may be a GUI element that references 2D and 3D elements that themselves are within the respective DAGs. The screen class can organize an entire rich media application into one or more screens that are navigated through by a user. Each screen may describe the screen elements to be displayed when that screen is made visible. The screen may contain screen specific parameters for its elements that should be applied/assigned when the screen is made visible.

The rich media database may contain the properties of 2D and 3D animation of its elements. The screen may describe two transitions: onactivate and ondeactivate. The onactivate transition may be used when the screen goes from visible to invisible, and the ondeactivate transition may be used when the screen goes from invisible to visible. The transition may have a time period (duration) associated with it and the various screen elements used to animate one or more of their parameters (such as position, orientation or visibility). Transitions may define the way in which a screen is transitioned into or out of any other screen.

The processing system 171 may maintain a list of previous screens that have been displayed, thereby permitting the customer through appropriate interface controls to go back to an earlier screen to undo or reconsider a selection that may have been made.

The processing system 171 may manage the payment acceptance device 109 and/or the cash disbursement device 111 in accordance with the transaction that is performed. This may be done under the control and guidance of the business rules in the business rules storage media 131.

The processing system 171 may communicate with other aspects of the business in which the point of sale computer system is being used. For example, it may direct orders to an order fulfilling department and/or billing information to an accounting department. This may be done under the control of the business rules.

By combining database technology with graphics technology and business rules, the point of sale computer system shown in FIG. 1 can provide a wide degree of flexibility, while at the same time making an extremely effective and, optionally, entertaining presentation to induce the customer to consummate a sale.

The database structure that may be used in conjunction with the graphics, business rules, control data, sound data and text data storage media 121, 131, 141, 151 and 161, respectively, allows very substantial and frequent changes in the presentation that the customer receives, without complex program modifications.

The business rules in the business rules database may be updated very frequently and easily to effectuate pricing changes, changes in the products or services that are offered, new promotions, etc. Similarly, the graphics, control data, sound data and text data can just as easily be changed, making desired changes to the format of the presentation that is made.

Other databases may be accessed in connection with the point of sale computer system. For example, databases containing data relating to customer loyalty and affinity programs may be accessed by the processing system and the business rules may be consulted for direction on the effect that this data should have. For example, the data might affect the graphics that are selected from the graphics storage media 121, as well as other information that is selected from the other storage media. The data from the other databases could affect the prices, products, services and promotions that are offered or emphasized.

In many situations, several kiosks can advantageously be used at a single point of sale location. Similarly, a single point of sale location may itself be a member of a larger business having other point of sale locations. If a business is large enough, the various points of sale locations may be segregated into regions, sub-regions, etc.

In many businesses, the products and services that are offered, as well as their prices and the manner of their presentation, might be managed by a main office. In some situations, it might instead be managed by a regional office or at the local store level. In still other situations, portions of the presentation might be managed by the main office, other portions by a regional office, and still further portions by a local store.

Figure 2:
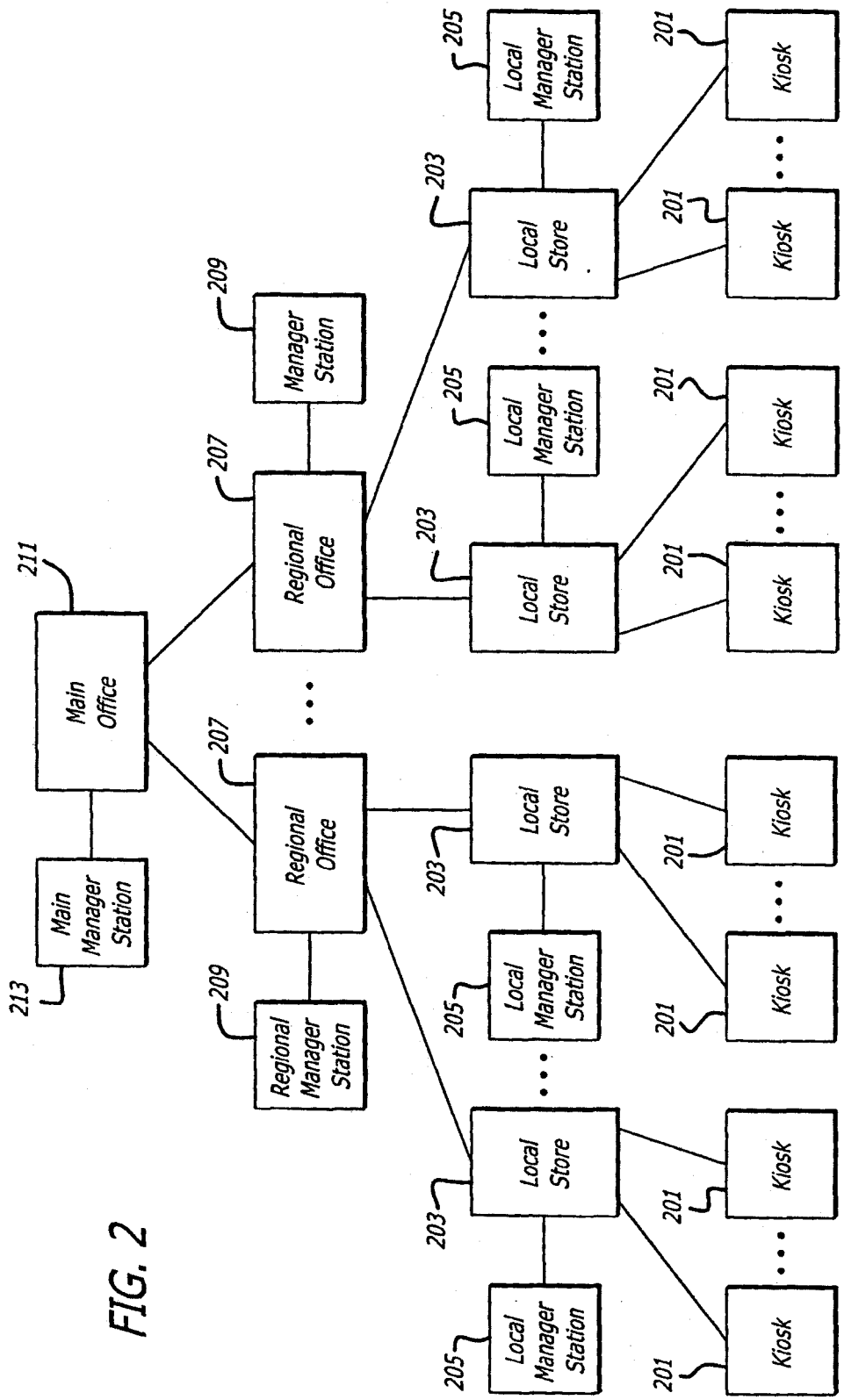
FIG. 2 is a block diagram of an enterprise level point of sale computer system.

FIG. 2 is a block diagram of an enterprise level point of sale computer system that addresses these needs. It illustrates one example of an enterprise level topology in which the point of sale computer system shown in FIG. 1 might be used.

As shown in FIG. 2, a plurality of kiosks 201 may be located in a plurality of local stores 203. Although not required, each local store 203 may itself contain a plurality of kiosks 201 and may be geographically-separated from the other local stores 203.

In FIG. 2, each kiosk 201 may include all of the components shown in FIG. 1, including the kiosk 101, the processing system 171, and the graphics, business rules, control data, sound data and text data storage media 121, 131, 141, 151 and 161, respectively. Alternatively, the payment acceptance device 109, the cash disbursement device 111, at least portions of the processing system 171, and the graphics, business rules, control data, sound data and text data storage media 121, 131, 141, 151 and 161, respectively, may be contained outside of the kiosk 201. One or more of these components may in certain configurations be shared by all of the kiosks 201 within a particular store 203.

Each local store 203 may include a local manager station 205. Among other functions, the local manager station 205 may be configured to allow changes to be made locally in the content of the graphics, business rules, control data, sound data and/or text data storage media 121, 131, 141, 151 and 161, respectively.

The enterprise may include one or more regional offices 207. Each regional office 207, in turn, may include a regional manager station 209. Each regional manager station may be configured to load and update the content of the graphics, business rules, control data, sound data and/or text data storage media 121, 131, 141, 151 and/or 161, respectively, to the local stores 203. Each regional manager station 209 may be used to completely control the content of the storage media, or may do so only in part or only in certain of the local stores 203. Each local manager station 205, in turn, may be provided with the ability to modify or supplement the data that has been provided under the control of a regional manager station 209.

The enterprise may include a main office 211. A main manager station 213 may be associated with the main office 211 and manage the content of the graphics, business rules, control data, sound data and text data storage media 121, 131, 141, 151 and 161, respectively, at the regional level and/or at the local level. This is much like the regional manager station 209, except that the main manager station 213 may be configured to have the authority to manage this content in any or all of the local stores 203.

Of course, it is to be understood that the enterprise might be smaller, having only a single local store 203. In this situation, however, the graphics, business rules, control data, sound data and text data storage media 121, 131, 141, 151 and 161, respectively, might still be shared among the various kiosks 201 within this local store.

In a medium-size enterprise, there might be no regional offices 207 or regional manager stations 209. In this situation, each local store 203 might communicate with and be controlled directly by the main office 211 in association with its main manager station 213.

In a larger enterprise, on the other hand, there might be sub-regional offices, as well as different or additional types of divisions. The topology shown in FIG. 2 can readily be modified accordingly.

Through the use of such an enterprise-level structure, a great deal of flexibility and efficiency can be achieved. Global loading and changes of the information stored in the various regional and local storage media can be made under a single directive, such as a directive issued by the main manager station 213. Changes that are required to be made on a regional or local level can similarly be made by a regional manager station 209 or, at the local level, by a local manager station 205.

The degree of allowable control by each manager station may be specified. For example, limits may be placed on the types of changes that each local manager station 205, regional manager station 209, or the main manager station 213 can implement. Conversely, each local manager station 205 may be given the authority to subscribe at its option to various content offerings and classes of content from its regional office 207 and/or its main office 211.

Although not shown, appropriate storage facilities may be provided in the regional office 207 or in the main office 211 to store the data that may be delivered to its subordinate office or offices.

Mechanisms may be provided to automate the updating process. For example, one or more of the systems in the enterprise may be programmed to periodically deliver or receive updates, such as during evening times when the local stores may be closed.

Of course, the local store 203 may need the ability to communicate with its respective regional office 209 and/or main office 211, and the regional offices may need the ability to communicate with its main office. Any communication system now known or later developed may be used. Such systems may include network communication systems implemented over the Internet, phone lines or even by satellite.

As should be apparent, software may be needed to implement the various functions of the systems and subsystems shown in FIGS. 1 and 2. The necessary software, as well as portions of the necessary software, may be provided on any of the types of media that are described above in connection with the graphics storage media 121. The needed software may be delivered at each computing location on such storage media, or it may be downloaded from such storage media over a network, such as the Internet.

Although the discussion has thus-far been focused on the consummation of a sale, it is to be understood that the systems that have been described have utility in connection with the consummation of any business transaction. For example, the systems described may be used to facilitate a customer's selection and reservation of an item to purchase. It may similarly be used for the purpose of allowing a customer to obtain credit or to open a charge account.

The systems that have been discussed may be used to enable a customer to select and obtain information about a product or service that is offered for sale at the location of the point of sale system. Such a configuration may or may not allow the customer to consummate a sale for an item determined to be of interest.

The descriptions that have now been provided are of illustrative embodiments and should enable a person of ordinary skill in the art to make and use the technology that is set forth in the claims below without undue experimentation. Numerous modifications to these embodiments will be readily apparent to those skilled in the art, and the principles defined in this discussion may be applied to other embodiments, without departing from the spirit or scope of the technology that is set forth and covered by the claims below.

What is claimed is:

1. A point of sale (POS) computer system that allows a customer to select and consummate a sale himself comprising:

a display configured to allow the customer to view a scene related to the selection and consummation process via the POS computer system;

an input device configured to be operated by the customer during the selection and consummation process and to generate control signals for controlling at least one component of the POS computer system in response to operation of the input device by the customer;

graphics storage media configured to store two and three-dimensional graphics data relating to the sale, wherein the three dimensional graphics data comprises data displayable from a plurality of viewing perspectives; and a processing system configured to:

communicate with the display, the input device, and the graphics storage media;

obtain selected two and three-dimensional graphics data in real time from the graphics storage media in response to the control signals received from the input device;

composite the obtained two and three-dimensional graphics data in real time into a non-linear, three-dimensional graphics presentation; and deliver the three-dimensional graphics presentation in real time to the display of the POS computer system for viewing by the customer.

2. The system of claim 1, wherein different types of three-dimensional graphics elements are each represented by its own class.

3. The system of claim 1, wherein the scene is represented as a directed acyclic graph configured to permit at least one of parent/child relationships and hierarchical constructs, wherein the directed acyclic graph comprises a three-dimensional directed acyclic graph for three-dimensional elements, and a two dimensional directed acyclic graph for two dimensional elements.

4. The system of claim 3, wherein the three-dimensional acyclic graph comprises hierarchical elements including transformations, material inheritance, and visibility inheritance.

5. The system of claim 1, wherein the wrapper comprising a layer of classes and functions includes at least one overlay class, wherein the overlay class is configured to specify a location on the display the two dimensional graphics elements should be displayed.

6. The system of claim 5, wherein the overlay class contains a full compositing tree of operations.

7. The system of claim 1, wherein the graphics storage media is stored in one or more database structures.

8. The system of claim 7, wherein communication between the database structures comprise ODBC plug-ins.

9. The system of claim 8, wherein the ODBC plug-ins are further configured to connect scene classes from the layer of classes to GPS data feeds.

10. The system of claim 3, wherein the layer of classes further comprises a screen class element that references two dimensional and three-dimensional elements within their respect directed acyclic graphs.

11. The system of claim 10, wherein the screen class is further configured to organize the three-dimensional graphics presentation includes a series of scenes, the content of each of which is dictated by the input received from the customer.

12. The system of claim 11, wherein the three-dimensional graphics presentation includes a programmed graphics transition between each scene.

13. The system of claim 12, wherein the programmed graphics transition comprises a first transition used when a scene goes from visible to invisible.

14. The system of claim 13, wherein the programmed graphics transition further comprises a second transition used when the scene goes from invisible to visible.

15. The system of claim 1, wherein the three-dimensional graphics presentation is provided by a wrapper comprising a layer of classes and functions which specify what, how, and where the two and three-dimensional graphics data is presented within the scene.

16. The system of claim 1, wherein the three-dimensional graphics presentation communicates in a language and wherein the language is based on a GPS data feed.

17. The system of claim 1, wherein variations of the viewing perspectives are defined as a function of time.

* * * * *